:::

(12) United States Patent
Shinzaki

(10) Patent No.: US 7,689,013 B2
(45) Date of Patent: Mar. 30, 2010

(54) IDENTIFYING DEVICE BY BIOMETRICS INFORMATION

(75) Inventor: Takashi Shinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 929 days.

(21) Appl. No.: 11/483,874

(22) Filed: Jul. 11, 2006

(65) Prior Publication Data

US 2009/0232367 A1     Sep. 17, 2009

Related U.S. Application Data

(63) Continuation of application No. PCT/JP2004/000153, filed on Jan. 13, 2004.

(51) Int. Cl.
*G06K 9/00* (2006.01)

(52) U.S. Cl. .................. 382/124; 382/100; 382/115; 340/5.52; 340/5.53; 340/5.82; 340/5.83; 396/15

(58) Field of Classification Search ............ 250/341.7, 250/341.8; 340/5.52, 5.53, 5.82, 5.83; 356/51, 356/71; 382/100, 115, 124–127, 197, 321, 382/210, 218, 304–305, 312; 396/15; 902/3
See application file for complete search history.

(56) References Cited

U.S. PATENT DOCUMENTS

| 5,077,803 | A | 12/1991 | Kato et al. ................. 382/4 |
| 5,088,817 | A | 2/1992 | Igaki et al. ................. 356/71 |
| 6,144,757 | A | 11/2000 | Fukuzumi .................. 382/124 |
| 6,289,114 | B1 | 9/2001 | Mainguet .................. 382/124 |
| 6,349,227 | B1 * | 2/2002 | Numada .................... 600/310 |
| 6,501,284 | B1 | 12/2002 | Gozzini ..................... 324/681 |
| 2001/0017584 | A1 * | 8/2001 | Shinzaki .................... 340/5.52 |
| 2001/0026632 | A1 | 10/2001 | Tamai ....................... 382/116 |
| 2002/0009213 | A1 * | 1/2002 | Rowe et al. ................ 382/115 |
| 2002/0076089 | A1 | 6/2002 | Muramatsu et al. ........ 382/124 |
| 2002/0122572 | A1 | 9/2002 | Seal et al. .................. 382/117 |
| 2002/0126881 | A1 * | 9/2002 | Langley .................... 382/124 |
| 2003/0016345 | A1 * | 1/2003 | Nagasaka et al. .......... 356/71 |
| 2003/0044051 | A1 | 3/2003 | Fujieda ..................... 382/124 |
| 2003/0123714 | A1 | 7/2003 | O'Gorman et al. |

FOREIGN PATENT DOCUMENTS

| EP | 0 359 554 A2 | 3/1990 |
| EP | 0372748 | 6/1990 |
| GB | 2 345 140 | 6/2000 |
| JP | 62-74173 | 4/1987 |

(Continued)

*Primary Examiner*—Andrew W Johns
*Assistant Examiner*—Jason Heidemann
(74) *Attorney, Agent, or Firm*—Fujitsu Patent Center

(57) ABSTRACT

In an identifying device for performing personal identification using biometrics information such as an iris, face, blood vessel pattern, auricle, fingerprint, palm print, hand print or the like, in order to surely discriminate a living body from a non-living body and to surely preclude illegal use by impersonation using a forged fingerprint or the like, a biometrics information input section samples/inputs biometrics information for verification as image information from a living body portion relatively moving with respect to this biometrics information input section, and living-body detection surfaces in a living-body detecting means is arranged in contact with or in the proximity to the living body portion being moved with respect to the biometrics information input section so as to input the biometrics information for verification.

4 Claims, 11 Drawing Sheets

FOREIGN PATENT DOCUMENTS

| | | |
|---|---|---|
| JP | 2-1243 | 1/1990 |
| JP | 2-5190 | 1/1990 |
| JP | 2-110780 | 4/1990 |
| JP | 2-194485 | 8/1990 |
| JP | 3-87980 | 4/1991 |
| JP | 3-226186 | 11/1991 |
| JP | 6-187430 | 7/1994 |
| JP | 9-265521 | 10/1997 |
| JP | 11-45338 | 2/1999 |
| JP | 2001-142849 | 5/2001 |
| JP | 2001-184490 | 7/2001 |
| JP | 2001-355360 | 12/2001 |
| JP | 2002-218158 | 8/2002 |
| JP | 2002-251614 | 9/2002 |
| JP | 2002-312772 | 10/2002 |
| JP | 2003-58508 | 2/2003 |
| JP | 203-85538 | 3/2003 |
| JP | 2003-331268 | 11/2003 |

* cited by examiner

MOVING DIRECTION

IDENTIFYING DEVICE BY BIOMETRICS INFORMATION

This application is a continuation application, filed under 35 USC 111(a), of International Application PCT/JP2004/000153, filed Jan. 13, 2004.

TECHNICAL FIELD

The present invention relates to an identifying device for personal identification using biometrics information such as iris, face, blood vessel pattern, auricle, fingerprint, palm print or hand print, for example, and particularly to an identifying device having a living-body detecting function for detecting if a living body portion, for which the biometrics information is to be sampled, is a living body or not at sampling of the biometrics information from the living body portion of a person to be identified.

BACKGROUND ART

Small-sized information equipment including a cellular phone and a Personal Digital Assistant (PDA) has become capable of connection to a network and storage of a large amount of personal information with recent sophistication of functions, and a demand for improvement of security function in such equipment is extremely high.

In order to ensure security in such equipment, personal identification using a password or ID (IDentifiacton) card, which has been widely used, may be employed. However, the password or ID card has a high risk of plagiarism, and realization of more reliable personal identification (identification that a user of equipment is the user himself/herself registered in advance) is in a strong demand. Personal identification by biometrics information is highly reliable and considered to be able to satisfy the above demand. Particularly, use of a fingerprint as the biometrics information is convenient.

When the fingerprint is used as the biometrics information for personal identification, a fingerprint (pattern consisting of ridge lines, which can contact with a sampling surface of a fingerprint sensor, and valley lines, which do not contact with the sampling surface) is sampled by a capacitance type fingerprint sensor or an optical fingerprint sensor from a finger of a person to be identified as image information. Then, by extracting characteristic information (position information on branch points and endpoints, for example) from a foreground of the fingerprint image (ridge line image, for example) and by verifying the extracted characteristic information with registered characteristic information of the person to be identified that was registered in advance, determination is made if the person to be identified is the person himself/herself, that is, personal identification is performed.

A general fingerprint sensor for sampling a fingerprint image from a person to be identified (hereinafter referred to as planar finger sensor in some cases) usually has a sensor surface (sampling surface) larger than the size of a finger. However, in order to mount a fingerprint sensor in small-sized information equipment such as a cellular phone and PDA, the size of the sensor surface is made smaller than that of a finger and a plurality of partial images continuously sampled through the sensor surface are integrated to obtain an image of the entire fingerprint.

Such a situation is handled by a sweep type fingerprint sensor. This sweep type fingerprint sensor has a rectangular sampling surface (sensor surface/image pickup surface) with the length sufficiently shorter than that of a finger and having a small area. Attempts are made such that, by moving a finger with respect to the sampling surface or by moving the sampling surface (fingerprint sensor) with respect to the finger, a plurality of partial images of a fingerprint of the finger is continuously sampled and the entire fingerprint image of the finger is reconfigured from the sampled plural partial images. Note that, the above relative movement of the finger with respect to the sampling surface is referred to as "Sweep". Moreover, information of minutiae (branch points or end points of ridge lines) is extracted/generated from the reconfigured fingerprint image, and the above personal identification is performed based on the information.

In a personal identification system using a fingerprint as above, illegal use using a forged fingerprint has been pointed out as one of problems in realizing more reliable personal identification. That is, in the system using fingerprints, there is a possibility that a finger having a forged fingerprint is artificially made and impersonation might be committed using the artificial finger. And the illegal use by impersonation might undermine reliability of the system.

When silicon or rubber is used as a material for the artificial finger, since these materials do not conduct electricity and a capacitance type fingerprint sensor does not have a function to sample a fingerprint image from an artificial finger made of silicon or an artificial finger made of rubber, the above illegal use can not be committed. The optical fingerprint sensor can not sample a fingerprint image from an artificial finger made of silicon or an artificial finger made of rubber in principle, either.

However, it is pointed out that, if gummy substance (substance having the same water content as a human finger, obtained by gelatinizing a gelatin solution) with composition extremely close to that on a human skin is used as the material for the artificial finger, since the gummy substance conducts electricity, the capacitance type fingerprint sensor or optical fingerprint sensor can sample a fingerprint image from the artificial finger made of gummy substance, which enables illegal use by impersonation.

Then, the above-mentioned planar fingerprint sensor has employed a method to detect if a finger, for which a fingerprint image is being sampled, is a living body or not while the finger is placed on a sensor surface of the planar fingerprint sensor to prevent impersonation (illegal use using a forged fingerprint) by an artificial finger (forged fingerprint (See the following Patent Documents 1 to 8, for example).

Patent Document 1: Japanese Patent Laid-Open (Kokai) No. Sho 62-74173
Patent Document 2: Japanese Patent Laid-Open (Kokai) No. Hei 2-110780
Patent Document 3: Japanese Patent Laid-Open (Kokai) No. Hei 2-144684
Patent Document 4: Japanese Patent Laid-Open (Kokai) No. Hei 2-144685
Patent Document 5: Japanese Patent Laid-Open (Kokai) No. Hei 2-259969
Patent Document 6: Japanese Patent Laid-Open (Kokai) No. Hei 6-187430
Patent Document 7: Japanese Patent Laid-Open (Kokai) No. Hei 11-45338
Patent Document 8: Japanese Patent Laid-Open (Kokai) No. 2000-172833

On the other hand, with the above-mentioned sweep type fingerprint sensor, the finger should be moved with respect to the rectangular sampling surface in a strip state to sample a fingerprint image, and the sweep type fingerprint sensor can not detect if the finger, for which the fingerprint is to be sampled, is a living body or not with the methods disclosed in the above Patent Documents 1 to 8. A detection surface for detecting a living body may be provided in addition to the rectangular sampling surface so that fingerprint sampling and living-body detection can be performed separately. However, in this case, illegal use by impersonation is possible by using a real finger (living body) on the detection surface while using a forged fingerprint on the rectangular sampling surface. Therefore, reliable detection on whether the finger, for which a fingerprint image is just being sampled, on the rectangular sampling surface of the sweep type fingerprint sensor is a living body or not is in demand.

Moreover, personal identification using image information of iris, face, auricle or the like as biometrics information is known other than the personal identification using a fingerprint as biometrics information. In this case, a picture of an iris, face, auricle or the like is taken by a camera and characteristic information is extracted from the captured image, and the extracted characteristic information is verified with registered characteristic information of a person to be identified, which is registered in advance, so as to determine if the person to be identified is the person himself/herself, that is, to perform personal identification. However, even in this personal identification, illegal use by impersonation is possible by presenting a display device displaying a high-definition dynamic image or a still image or presenting a printed matter on which a high-definition image is printed out. Therefore, even in the case of personal identification using image information of iris, face, auricle or the like as biometrics information, reliable detection on whether the iris, face, auricle or the like being captured by a camera as biometrics information is a forged one such as a display or a printed matter is in demand.

The present invention was made in view of the problems stated above and has an object to surely preclude illegal use by impersonation using a forged fingerprint or the like and to realize more reliable personal identification by enabling reliable detection on whether a living body portion, for which a fingerprint image is being sampled, for example by a sweep type fingerprint sensor, is a living body or not, so that a non-living body such as an artificial finger made of gummy substance or the like and a living body can be surely discriminated.

Moreover, the present invention has an object to surely preclude illegal use by impersonation using a forged one or the like and to realize more reliable personal identification by enabling reliable detection on whether an iris, face, auricle or the like being captured by a camera, for example, as biometrics information is a forged one such as a display or a printed matter so that a forged one and a living body can be surely discriminated.

DISCLOSURE OF THE INVENTION

In order to achieve the above object, an identifying device by biometrics information of the present invention comprises a biometrics information input section for sampling biometrics information for verification, which is used for comparison/verification with registered biometrics information at personal identification, from a living body portion of a person to be identified and inputting the sampled biometrics information for verification, and a living-body detecting means for detecting if the living body portion, for which the biometrics information for verification, for which the biometrics information for verification is being sampled/inputted by the biometrics information input section, is a living body or not, wherein the biometrics information input section is to sample/input the biometrics information for verification as image information from the living body portion moving relatively with respect to the biometrics information input section, and the living-body detection surface in the living-body detecting means is arranged in contact with or in the proximity to the living body portion being moved with respect to the biometrics information input section so as to input the biometrics information for verification.

At this time, the living-body detection surface in the living-body detecting means may be arranged flush with or substantially flush with an input surface for the biometrics information for verification which can contact with the living body portion in the biometrics information input section or may be arranged only on either of a moving direction side of the living body portion and a side opposite to the moving direction side. Also, the living-body detection surface in the living-body detecting means may be comprised by a pair, and the biometrics information input section may be arranged between the pair of living-body detection surfaces.

When the living body portion is a finger of the person to be identified and the biometrics information input section is to sample/input a fingerprint image of the finger as the biometrics information for verification, the living-body detecting means is constituted to detect a forged fingerprint. In this case, the living-body detecting means is constituted so as to discriminate a living body from a forged fingerprint as any one of the following (1) to (9), for example:

(1) The living-body detecting means irradiates light of a specific wavelength group to the finger, receives transmitted light of the light from the finger and discriminates a living body from a forged fingerprint based on the received transmitted light.

(2) The living-body detecting means irradiates light of a specific wavelength to the finger, receives diffusion light of the light from the finger and discriminates a living body from a forged fingerprint by detecting pulsation based on intensity change of the received diffusion light.

(3) The living-body detecting means irradiates spot light of a specific wavelength to the finger, receives diffusion light of the spot light from the finger and discriminates a living body from a forged fingerprint based on diffusion degree of the received diffusion light.

(4) The living-body detecting means irradiates white light to the finger, detects a color of the finger based on the light from the finger and discriminates a living body from a forged fingerprint based on the detected color.

(5) The living-body detecting means detects a pressing force of the finger and discriminates a living body from a forged fingerprint based on the detected pressing force.

(6) The living-body detecting means detects an acceleration of the finger and discriminates a living body from a forged fingerprint based on change of the detected acceleration.

(7) The living-body detecting means detects an electric resistance value of the finger and discriminates a living body from a forged fingerprint based on the detected electric resistance value.

(8) The biometrics information input section is a fingerprint sensor of a capacitance type or an electric-field detection type, and the living-body detecting means applies an electric noise of a specific pattern to the finger and discriminates a living body from a forged fingerprint based on appearance situation of the noise on a fingerprint image sampled by the fingerprint sensor.

(9) The living-body detecting means samples a blood vessel pattern in the finger by irradiating light to the finger and discriminates a living body from a forged fingerprint based on the sampled blood vessel pattern. Particularly, in this case, the living-body detecting means may sample a blood vessel pattern in the finger by a line sensor, and an image of the blood vessel pattern in the finger may be reconfigured from partial images sampled by the line sensor based on a fingerprint image sampled by the biometrics information input section. Alternatively, the fingerprint image may be reconfigured from partial images sampled by the biometrics information input section based on an image of the blood vessel pattern in the finger sampled by the line sensor.

In the above-mentioned identifying device, the biometrics information input section may have a width capable of simultaneously sampling/inputting fingerprint images of a plurality of fingers as the living body portion.

In the meantime, the identifying device by biometrics information of the present invention comprises a fingerprint sensor of a capacitance type or an electric-field detection type for sampling a fingerprint image for verification, which is used for comparison/verification with a registered fingerprint image at personal identification, from a finger of a person to be identified and inputting the sampled fingerprint image for verification, and a living-body detecting means for detecting if a finger, for which the fingerprint image for verification is being sampled/inputted by the fingerprint sensor, is a living body or not, and the living-body detecting means applies an electric noise of a specific pattern to the finger and discriminates a living body from a forged fingerprint based on appearance situation of the noise on a fingerprint image sampled by the fingerprint sensor.

Moreover, the identifying device by biometrics information of the present invention comprises a biometrics information input section for sampling biometrics information for verification, which is used for comparison/verification with registered biometrics information at personal identification, from a living body portion of a person to be identified and inputting the sampled biometrics information for verification, and a living-body detecting means for detecting if the living body portion, for which the biometrics information for verification is being sampled/inputted by the biometrics information input section, is a living body or not, and the biometrics information input section is to pick up an image of the living body portion and to sample/input the biometrics information for verification as image information, and the living-body detecting means is to obtain a close-up image of the living body portion and when a regular color pixel array is detected in the obtained close-up image, it is determined that the image information sampled by the biometrics information input section is inputted by a forged object, which is not a living body.

In this case, the biometrics information input section may sample/input an image of at least one of iris, face, blood vessel pattern, auricle, fingerprint, palm print or hand print as the biometrics information for verification. Also, component colors of the regular color pixel array are a combination of red, green, blue or a combination of yellow, magenta, cyan, black or a combination of yellow, magenta, cyan.

BEST MODES FOR CARRYING OUT THE INVENTION

Preferred embodiments of the present invention will be described below referring to the attached drawings.

[1] Basic Construction

Figure 1A:
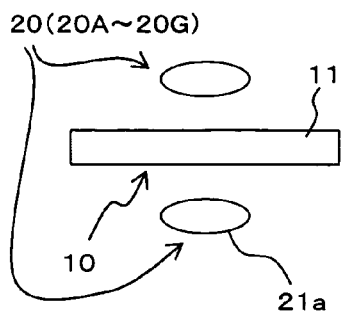
FIGS. 1(A) to 1(C) are plan views schematically showing arrangement states of a sensor (sensor surface) in an identifying device by biometrics information according to a first to an eighth embodiments of the present invention, respectively.
Figure 1B:
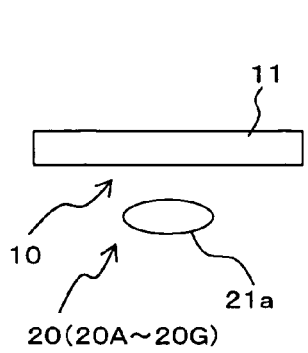
Figure 1C:
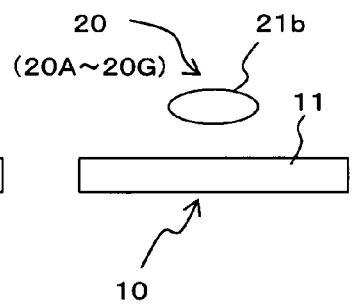
Figure 2:
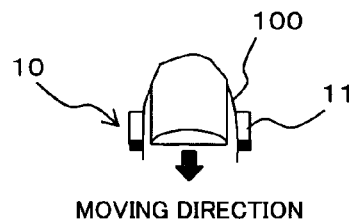
FIG. 2 is a view for explaining image sampling by a sweep type fingerprint sensor in the first to the eighth embodiments of the present invention.

FIGS. 1(A) to 1(C) and FIG. 2 are views for explaining arrangement of a sensor in an identifying device by biometrics information according to a first to an eighth embodiments of the present invention, in which FIGS. 1(A) to 1(C) are plan views schematically showing arrangement states of a sensor (sensor surface) in the identifying device of each embodiment, and FIG. 2 is a view for explaining image sampling by a sweep type fingerprint sensor in each preferred embodiment.

The identifying device in the first to the eighth embodiments is to identify that a person to be identified is the person himself/herself using a fingerprint (biometrics information) of the person to be identified and comprises a sweep type fingerprint sensor 10 of a capacitance type or an electric-field detection type (weak electric-field type) as shown in FIGS. 1(A) to 1(C) and FIG. 2.

This sweep type fingerprint sensor (biometrics information input section) 10 continuously samples an image of an outer skin surface of the person to be identified, moving in contact with a sampling surface (sensor surface, input surface) 11. More specifically, this sensor continuously samples partial images of a fingerprint of a finger 100 (See FIG. 2), which is a living body portion of the person to be identified, while the finger 100 is relatively moved with respect to the sampling surface 11, and inputs the partial images.

The fingerprint is formed on an outer skin (finger 100) of the person to be identified and is a pattern consisting of ridge lines (contact portion) capable of contacting with the sampling surface 11 and valley lines (noncontact portion/gap portion) not in contact with the sampling surface 11. The finger sensor 10 samples a fingerprint image as a multivalued image using a difference in detection sensitivity between the ridge line portion in contact with the sampling surface 11 and the valley portion not in contact with the sampling surface 11. The capacitance type sensor has different brightness according to a distance from the sensor, and normally, the ridge line portion close to the sensor is displayed with a low brightness, while the valley line portion relatively far from the sensor is displayed with a high brightness.

The sweep type fingerprint sensor 10 is, as described above and shown in FIGS. 1(A) to 1(C) and FIG. 2, sufficiently shorter than the length of the finger 100 and has the rectangular sampling surface (sensor surface/image pickup surface) 11 with a small area. For example, the number of pixels is 218×8 and the actual dimension is 16.1 mm×6.5 mm×0.8 mm (width×length×depth).

Particularly, in the first to the eighth embodiments of the present invention, the fingerprint sensor 10 is used for sampling biometrics information for verification (fingerprint image for verification), which is used for comparison/verification with registered biometrics information (registered fingerprint image) at personal identification from the finger 100 of the person to be identified and inputs the sampled biometrics information for verification.

Then, by moving the finger 100 with respect to the sampling surface 11 or moving the sampling surface 11 (fingerprint sensor 10) with respect to the finger 100, a plurality of partial images on the fingerprint of the finger 100 are continuously sampled by the fingerprint sensor 10, and the entire fingerprint image of the finger 100 (above fingerprint information for verification) is reconfigured in the identifying device from the sampled plural partial images.

Figure 18:
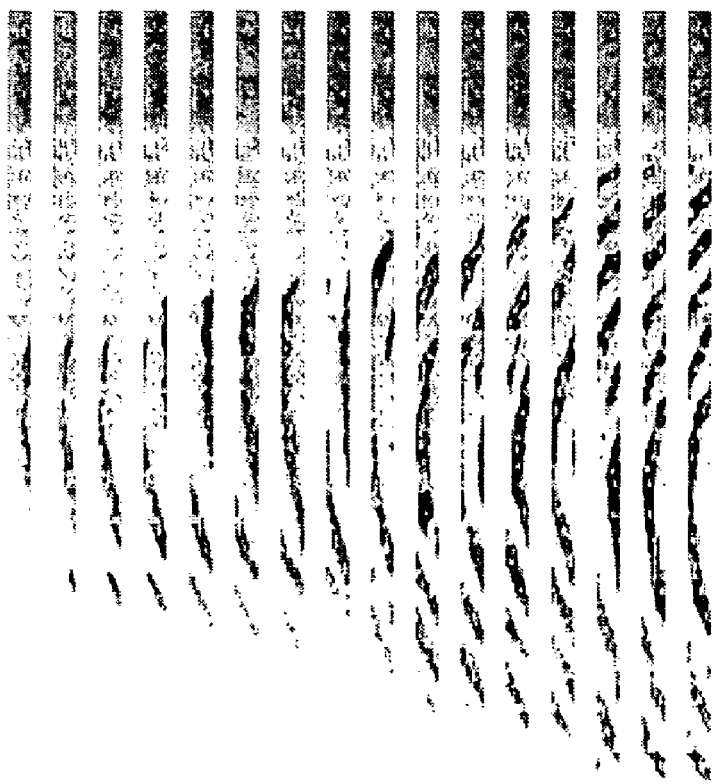
FIG. 18 is a view showing a concrete example of a plurality of strip-state partial images (fingerprint images) continuously sampled by the sweep type fingerprint sensor in the first to the eighth embodiments.

Here, a concrete example (an example of actually sampled plural partial fingerprint images) of the plural strip-state partial images continuously (in time-series manner) sampled by the sweep type fingerprint sensor 10 is shown in FIG. 18.

Also, in the identifying device in the first to the eighth embodiments, a living-body detecting means (living-body detecting sensor) 20 (20A to 20G) is provided for detecting if the finger 100, for which the above fingerprint image for verification is being sampled/inputted by the fingerprint sensor 10, is a living body or not (that is, if the finger to be sampled is a forged fingerprint or not).

In the first to the eighth embodiments of the present invention, an example of a measure against the forged fingerprint is shown for the sweep type fingerprint sensor 10 (or a fingerprint input device comprised by a one-dimensional line sensor or the like) for sampling/inputting the above-mentioned strip-state partial images. In the sweep type fingerprint sensor or the one-dimensional fingerprint input device, as mentioned above and shown in FIG. 2, the entire fingerprint image is inputted by tracing the sensor surface 11 with the finger 100. Therefore, the finger 100 passes both the far side of the fingerprint sensor 10 (upper side of FIGS. 1(A) to 1(C) and FIG. 2) and the front side (lower side of FIGS. 1(A) to 1(C) and FIG. 2) from the far side to the front side.

Thus, in the first to the eighth embodiments of the present invention, in order that the rectangular sampling surface (sensor surface) 11 of the sweep type fingerprint sensor 10 can surely detect if the finger 100, for which the finger print is just being sampled, is a living body or not, living-body detection surfaces (sensor surfaces) 21a, 21b in the above living-body detecting means 20 (20A to 20G) are arranged, as shown in FIGS. 1(A) to 1(C), so that they are in contact with or in the proximity to the finger 100 being moved with respect to the fingerprint sensor 10 so as to input the fingerprint image for verification and also flush with or substantially flush with the sampling surface 11 of the fingerprint sensor 10.

In the arrangement state shown in FIG. 1(A), the living-body detection surfaces 21a, 21b in the living-body detecting means 20 forms a pair, and the sampling surface 11 of the fingerprint sensor 10 is arranged between the pair of the living-body detection surfaces 21a, 21b.

In the arrangement state shown in FIG. 1(B), the living-body detection surface 21a in the living-body detecting means 20 is arranged only on the side of a moving direction of the finger 100 (the above front side; lower side in this figure) with respect to the sensor surface 11 of the fingerprint sensor 10.

In the arrangement state shown in FIG. 1(C), the living-body detection surface 21b in the living-body detecting means 20 is arranged only on the side opposite to the moving direction of the finger 100 (the above far side; upper side in this figure) with respect to the sensor surface 11 of the fingerprint sensor 10.

In this way, since it is necessary that the finger 100 should be also placed at spots other than the sensor surface 11 of the sweep type fingerprint sensor 10, different from the case of the planar fingerprint sensor, by arranging the living-body detection surface 21a and/or 21b of the living-body detecting means 20 (specifically, various living-body detecting means 20A to 20G, which will be described later referring to FIGS. 3 to 13) on one side or on both sides of the sensor surface of the fingerprint sensor 10, as mentioned above, sure detection is made possible by the rectangular sampling surface (sensor surface) 11 of the sweep type fingerprint sensor 10 on whether the finger 100, for which the fingerprint image is just being sampled, is a living body or not.

By this, it becomes possible to surely discriminate a living body from a non-living body such as an artificial finger made of gummy substance, for example, which surely precludes illegal use by impersonation using a forged fingerprint or the like and realizes more reliable personal identification. Particularly, when the sampling surface 11 of the fingerprint 10 is arranged between the pair of living-body detection surfaces 21a, 21b, as shown in FIG. 1(A), living-body detection is performed for the finger 100 immediately above the sampling surface 11, that is, the finger 100, for which the fingerprint image is just being sampled by the sweep type fingerprint sensor 10, which more surely precludes illegal act using a forged fingerprint or the like.

[2] Concrete Construction Example 2-1 First Embodiment

Figure 3:
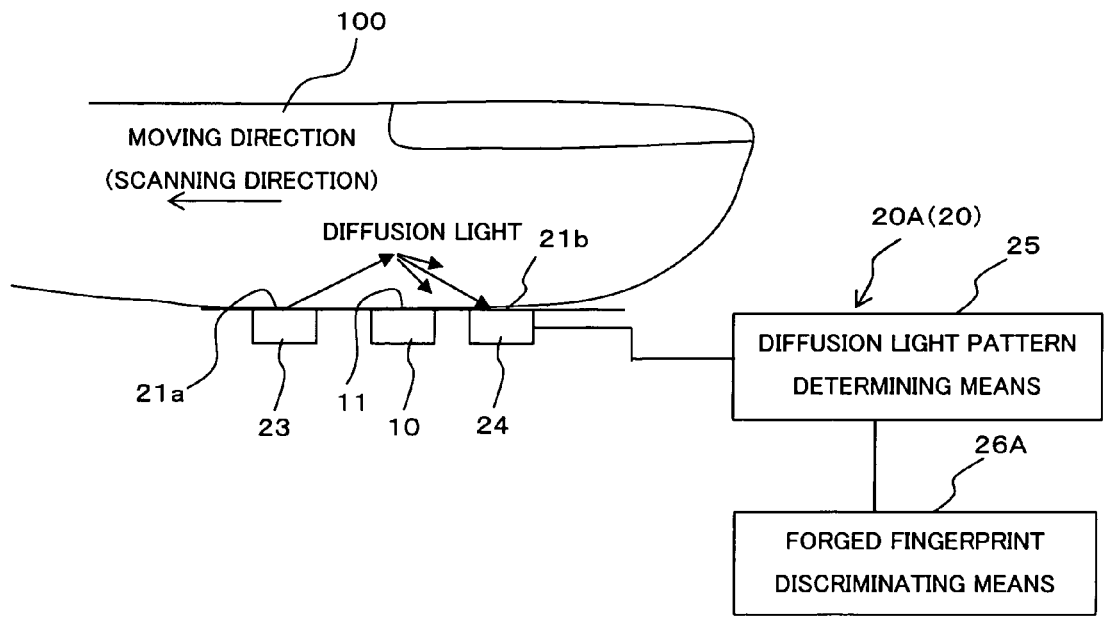
FIG. 3 is a block diagram showing a construction of an identifying device (living-body detecting means) by biometrics information as the first embodiment of the present invention.

FIG. 3 is a block diagram showing a construction of the identifying device (living-body detecting means) by biometrics information as the first embodiment of the present invention. The identifying device of the first embodiment shown in FIG. 3 is provided with a living-body detecting means (living-body detecting sensor) 20A comprised by a light emitting section 23, a light receiving section 24, a diffusion-light pattern determining means 25 and a forged fingerprint discriminating means 26A.

The light emitting section 23 emits and irradiates light of a specific wavelength to the finger 100, for which the fingerprint image is being sampled, and its light emitting surface is arranged in contact with the finger 100 being moved on the side of the finger moving direction (left side in this figure) of the sampling surface 11 as the living-body detection surface 21a and flush with or substantially flush with the sampling surface 11.

The light receiving section 24 receives diffusion light obtained when the light irradiated from the light emitting section 23 to the finger 100 is transmitted/diffused in the finger 100, and its light receiving surface is arranged in contact with the finger 100 being moved on the side opposite to the finger moving direction (right side in this figure) of the sampling surface 11 as the living-body detection surface 21b and flush with or substantially flush with the sampling surface 11.

That is, in the example shown in FIG. 3, similar to the arrangement state shown in FIG. 1(A), the living-body detection surfaces 21a, 21b (the light emitting surface of the light emitting section 23 and the light receiving surface of the light receiving section 24) in the living-body detecting means 20A form a pair, and the sampling surface 11 of the fingerprint sensor 10 is arranged between the pair of the living-body detection surfaces 21a, 21b.

And the diffusion-light pattern determining means 25 determines a pattern of the diffusion light received by the light receiving section 24, and the forged fingerprint discriminating means 26A discriminates a living body from a forged fingerprint based on the determination result by the diffusion-light pattern determining means 25.

More specifically, the diffusion-light pattern determining means 25 determines a pattern of intensity change of the diffusion light received by the light receiving section 24, and the forged fingerprint discriminating means 26A determines that the finger 100, for which the fingerprint image is being sampled, is a living body when the pattern determined by the diffusion-light pattern determining means 25 includes pulsation and that the finger 100, for which the fingerprint image is being sampled, is a forged fingerprint when the pattern does not include the pulsation.

That is, when the finger 100, for which the fingerprint image is being sampled, is a living body, a blood flow in the finger 100 changes with heartbeat, and pulsation is generated in the intensity of the diffusion light with pulsation (pulsation according to heartbeat) accompanying the change in the blood flow. But the above pulsation is not generated in a forged finger made by gummy substance or the like, for example.

Then, the living-body detecting means 20A shown in FIG. 3 can discriminate a living body from a forged fingerprint by the forged fingerprint discriminating means 26A based on the result if the pattern of intensity change of the diffusion light includes pulsation or not.

Here, a first modification of the living-body detecting means 20A of the first embodiment will be described. This first modification is so constituted that a section for irradiating a spot light of a specific wavelength is provided as the light emitting section 23, a section in a line sensor state is provided as the light receiving section 24, the diffusion-light pattern determining means 25 determines a degree of diffusion of the diffusion light as a pattern of the diffusion light received by the light receiving section 24, and the forged fingerprint discriminating means 26A discriminates a living body from a forged fingerprint based on the diffusion degree determined by the diffusion-light pattern determining means 25.

Since the inside of a forged finger made by gelatin, for example, is close to a transparent state (or translucent state), the spot light irradiated from the light emitting section 23 is not much diffused but transmitted through the forged finger as it is and received by the light receiving section 24 in the line sensor state. That is, the diffusion degree of the diffusion light is considerably small. On the other hand, if the finger 100 is a living body, the spot light irradiated from the light emitting section 23 is greatly diffused in the finger 100 and received by the light receiving section 24 in the line sensor state. That is, the diffusion degree of the diffusion light is considerably large.

Therefore, in this first modification, discrimination between a living body and a forged fingerprint based on the diffusion degree of the diffusion light is made possible by the forged fingerprint discriminating means 26A. At this time, if the light receiving range of the diffusion light is wide in the light receiving section 24 in the line sensor state, the diffusion degree is determined as large, while if the light receiving range of the diffusion light is narrow, the diffusion degree is determined as small.

Moreover, a second modification of the living-body detecting means 20A of the first embodiment will be described. This second modification is so constituted that a section for irradiating light of a specific wavelength group (a wavelength group absorbed in blood, for example; specifically, red light, near-infrared light in LED) is provided as the light emitting section 23, the diffusion-light pattern determining means 25 determines a wavelength of the diffusion light as a pattern of the diffusion light received by the light receiving section 24, and the forged fingerprint discriminating means 26A discriminates a living body from a forged fingerprint based on the wavelength determined by the diffusion-light pattern determining means 25.

As mentioned above, when light of a wavelength group absorbed by blood is irradiated to the finger 100, if the finger 100 is a living body, most of the irradiated light is absorbed by the blood in the finger 100, but if the finger 100 is a forged finger, the irradiated light is hardly absorbed but transmitted as it is.

Thus, in this second modification, discrimination between a living body and a forged fingerprint based on presence/absence of light of a specific wavelength group in the diffusion light received by the light receiving section 24 is made possible by the forged fingerprint discriminating means 26A.

It is to be noted that in the above-mentioned constructions of the first embodiment, the pair of living-body detection surfaces 21a, 21b (the light emitting surface of the light emitting section 23 and the light receiving surface of the light receiving section 24) are arranged so that the sampling surface 11 of the fingerprint sensor 10 is arranged between them, but both the light emitting surface of the light emitting section 23 and the light receiving surface of the light receiving section 24 may be arranged as the living-body detection surface 21a on the side of the finger moving direction (left side in the figure) of the sampling surface 11 as in the arrangement state shown in FIG. 1(B), or they may be arranged as the living-body detection surface 21b on the side opposite to the finger moving direction (right side in the figure) of the sampling surface 11 as in the arrangement state shown in FIG. 1(C).

2-2 Second Preferred Embodiment

Figure 4:
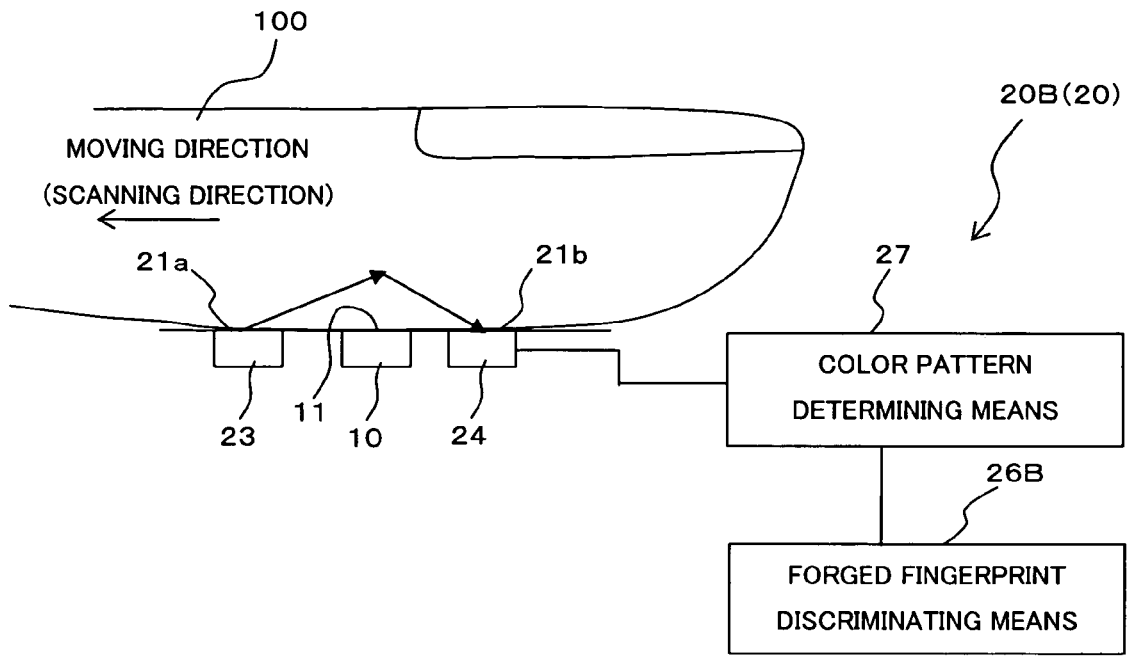
FIG. 4 is a block diagram showing a construction of an identifying device (living-body detecting means) by biometrics information as the second embodiment of the present invention.

FIG. 4 is a block diagram showing a construction of the identifying device (living-body detecting means) by biometrics information as the second embodiment of the present invention. The identifying device of the second embodiment shown in FIG. 4 is provided with a living-body detecting means (living-body detecting sensor) 20B comprised by the light emitting section 23, the light receiving section 24, a color pattern determining means 27 and a forged fingerprint discriminating means 26B.

The light emitting section 23 emits and irradiates white light to the finger 100, for which the fingerprint image is being sampled, and its light emitting surface is arranged in contact with the finger 100 being moved on the side of the finger moving direction (left side in this figure) of the sampling surface 11 as the living-body detection surface 21a and flush with or substantially flush with the sampling surface 11.

The light receiving section 24 receives light obtained when the light irradiated from the light emitting section 23 to the finger 100 is transmitted/diffused in the finger 100, and its light receiving surface is arranged in contact with the finger 100 being moved on the side opposite to the finger moving direction (right side in this figure) of the sampling surface 11 as the living-body detection surface 21b and flush with or substantially flush with the sampling surface 11.

That is, in the example shown in FIG. 4, similar to the arrangement state shown in FIG. 1(A), the living-body detection surfaces 21a, 21b (the light emitting surface of the light emitting section 23 and the light receiving surface of the light receiving section 24) in the living-body detecting means 20B form a pair, and the sampling surface 11 of the fingerprint sensor 10 is arranged between the pair of the living-body detection surfaces 21a, 21b.

The color pattern determining means 27 detects/determines a color pattern of the light received by the light receiving section 24, and the forged fingerprint discriminating means 26B discriminates a living body from a forged fingerprint based on the determination result by the color pattern determining means 27. More specifically, the forged fingerprint discriminating means 26B determines that the finger 100, for which the fingerprint image is being sampled, is a living body when the color pattern determined by the color pattern determining means 27 is white (when it changes from red (pink) to white) and that the finger 100, for which the fingerprint image is being sampled, is a forged fingerprint when the color pattern is not white (when the above change does not occur).

That is, when the finger 100, for which the fingerprint image is being sampled, is a living body, if the finger 100 is pressed on the sampling surface 11, blood in the finger 100 changes from red (pink) to white in general. However, when a forged finger made by gummy substance or gelatin, for example, is pressed on the sampling surface 11, it does not change to white or change from red (pink) to white, either.

Thus, the living-body detecting means 20B shown in FIG. 4 can discriminate a living body from a forged fingerprint based on the result whether the color detected/determined by the color pattern determining means 27 is white or not (or, whether there was a change from red (pink) to white), using the forged fingerprint discriminating means 26B.

Figure 5:
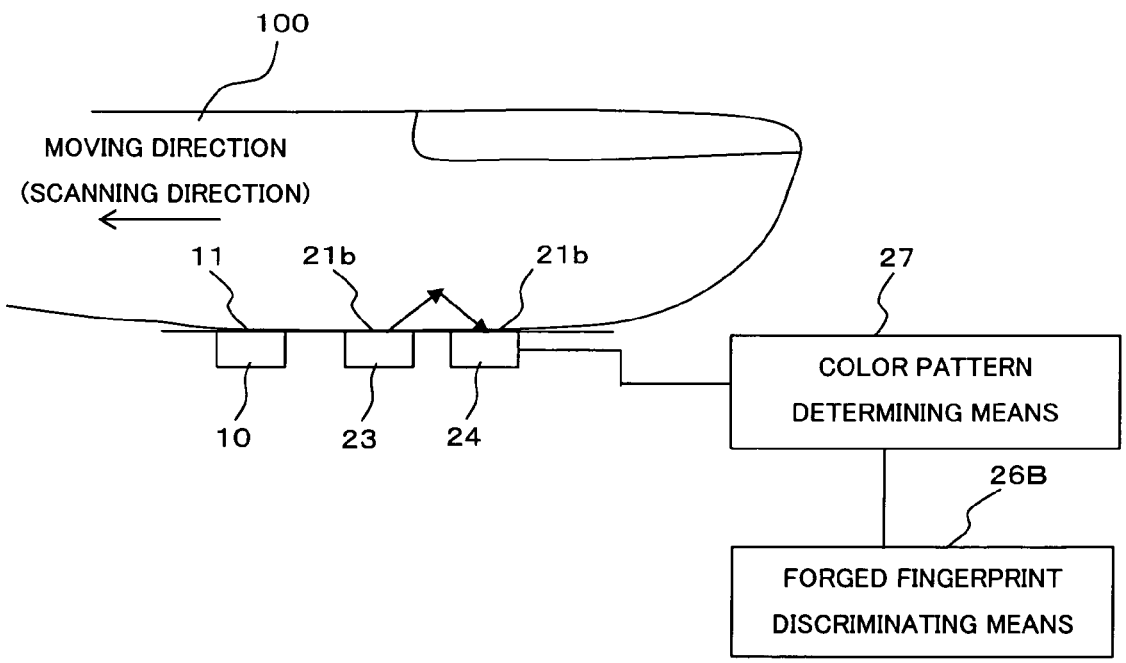
FIG. 5 is a block diagram showing a construction of a modification of the identifying device (living-body detecting means) by biometrics information as the second embodiment of the present invention.

In addition, FIG. 5 is a block diagram showing a construction of a modification of an identifying device (living-body detecting means) by biometrics information as the second embodiment of the present invention. In the construction shown in FIG. 4, the pair of living-body detection surfaces 21a, 21b (the light emitting surface of the light emitting section 23 and the light receiving surface of the light receiving section 24) are arranged with the sampling surface 11 of the fingerprint sensor 10 between them. However, in the modification shown in FIG. 5, both the light emitting surface of the light emitting section 23 and the light receiving surface of the light receiving section 24 are arranged as the living-body detection surface 21b on the side (right side in the figure) opposite to the finger moving direction of the sampling surface 11 as in the arrangement state shown in FIG. 1(C). The construction of the identifying device shown in FIG. 5 (the living-body detecting means 20B) other than this arrangement state of light emitting surface of the light emitting section 23 and the light receiving surface of the light receiving section 24 is the same as the construction shown in FIG. 4. The light emitting surface of the light emitting section 23 is arranged between the sampling surface 11 of the fingerprint sensor 10 and the light receiving surface of the light receiving section 24.

Moreover, both the light emitting surface of the light emitting section 23 and the light receiving surface of the light receiving section 24 may also be arranged as the living-body detection surface 21a on the side (left side in the figure) of the finger moving direction of the sampling surface 11 in this second embodiment, though not shown, as in the arrangement state shown in FIG. 1(B).

2-3 Third Embodiment

Figure 6:
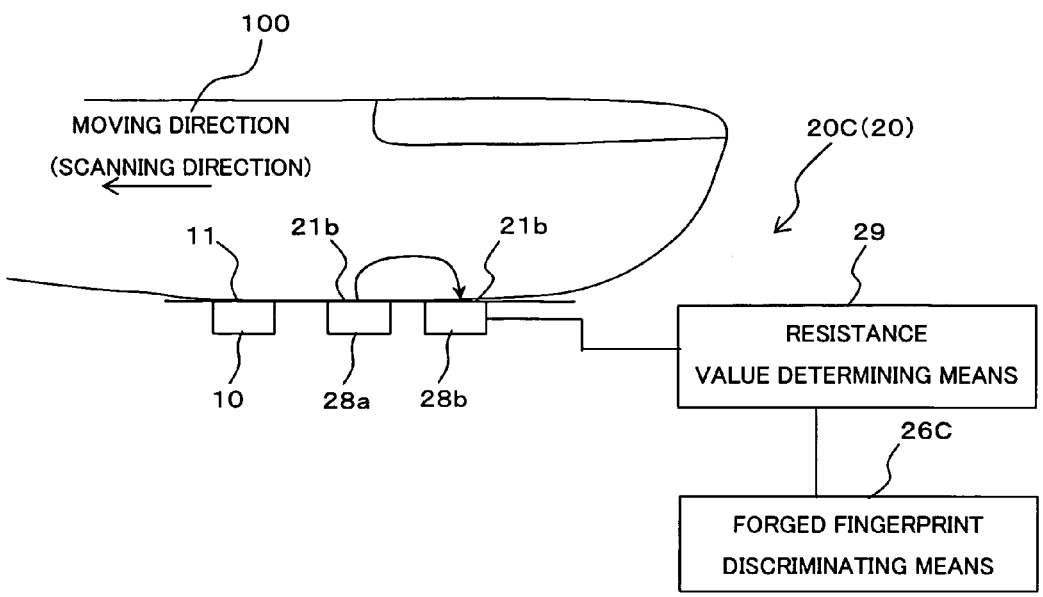
FIG. 6 is a block diagram showing a construction of an identifying device (living-body detecting means) by biometrics information as the third embodiment of the present invention.

FIG. 6 is a block diagram showing a construction of the identifying device (living-body detecting means) by biometrics information as the third embodiment of the present invention. The identifying device of the third embodiment shown in FIG. 6 is provided with a living-body detecting means (living-body detecting sensor) 20C comprised by a pair of electrodes 28a, 28b, a resistance value determining means 29 and a forged fingerprint discriminating means 26C.

The pair of electrodes 28a, 28b receives an electric power of a predetermined voltage from a power source, not shown, and flows an electric current through the finger 100, for which the fingerprint image is being sampled, from the electrode 28a to the electrode 28b. Exposed surfaces of the electrodes 28a, 28b are arranged as the living-body detection surface 21b to be in contact with the finger 100 being moved on the side (right side in the figure) opposite to the finger moving direction of the sampling surface 11 and flush with or substantially flush with the sampling surface 11 as in the arrangement state shown in FIG. 1(C). Note that the exposed surface of the electrode 28a is arranged between the sampling surface 11 of the fingerprint sensor 10 and the exposed surface of the electrode 28b.

And the resistance value determining means 29 detects/determines an electric resistance value between the electrodes 28a, 28b (that is, the electric resistance value of the finger 100, for which the fingerprint image is being sampled) by detecting an electric current flowing from the electrode 28a to the electrode 28b, and the forged fingerprint discriminating 26C discriminates a living body from a forged fingerprint based on the electric resistance value detected/determined by the resistance value determining means 29. More specifically, since the living body and the forged finger made of gummy substance, gelatin or the like are naturally different from each other in electric resistance values, by measuring/storing an electric resistance value (range of electric resistance value) of a living body in advance, discrimination between the living body and the forged fingerprint can be made by the forged fingerprint discriminating means 26C based on the result on whether the electric resistance value detected by the resistance value determining means 29 falls within a predetermined range or not. That is, if the electric resistance value detected by the resistance value determining means 29 falls within the predetermined range, the finger 100, for which the fingerprint image is being sampled, is determined as a living body, while if the value does not fall within the range, the finger 100, for which the fingerprint image is being sampled, is determined as a forged finger.

In the construction of the above-mentioned third embodiment, exposed surfaces of the pair of the electrodes 28a, 28b are arranged as the living-body detection surface 21b on the side (right side in the figure) opposite to the finger moving direction of the sampling surface 11, but they may be arranged as the respective living-body detection surfaces 21a, 21b with the sampling surface 11 of the fingerprint sensor 10 between them as in the arrangement state shown in FIG. 1(A), or they may be arranged as the living-body detection surface 21a on the side (left side in the figure) of the finger moving direction of the sampling surface 11 as in the arrangement state shown in FIG. 1(B).

2-4 Fourth Embodiment

Figure 7:
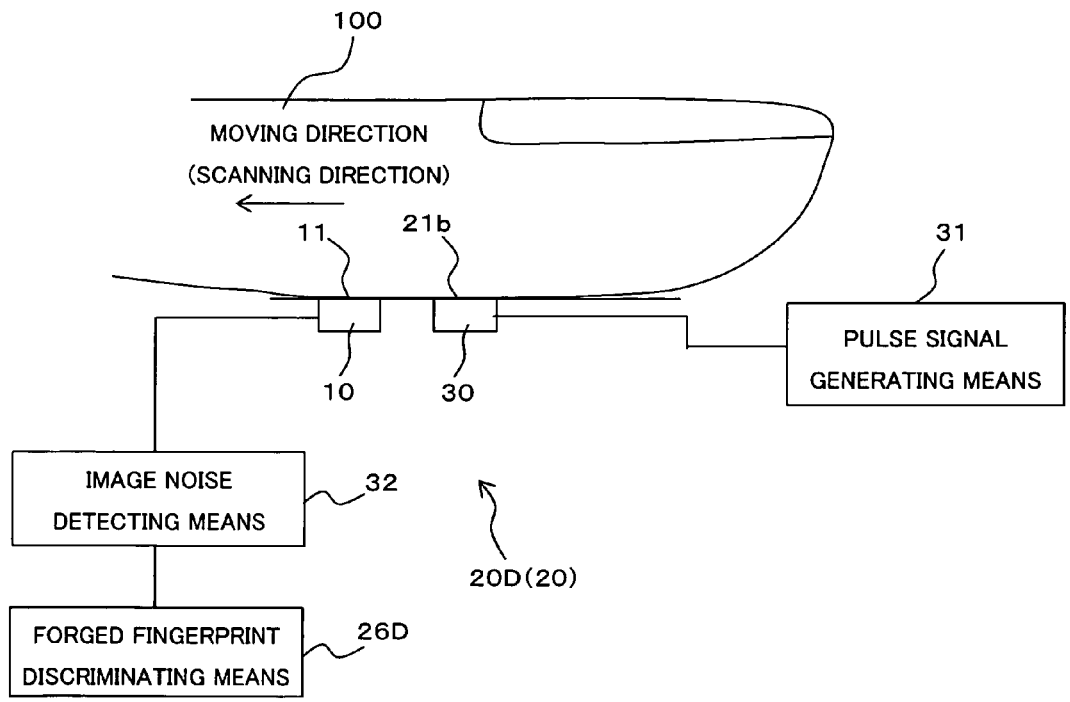
FIG. 7 is a block diagram showing a construction of an identifying device (living-body detecting means) by biometrics information as the fourth embodiment of the present invention.
Figure 8:
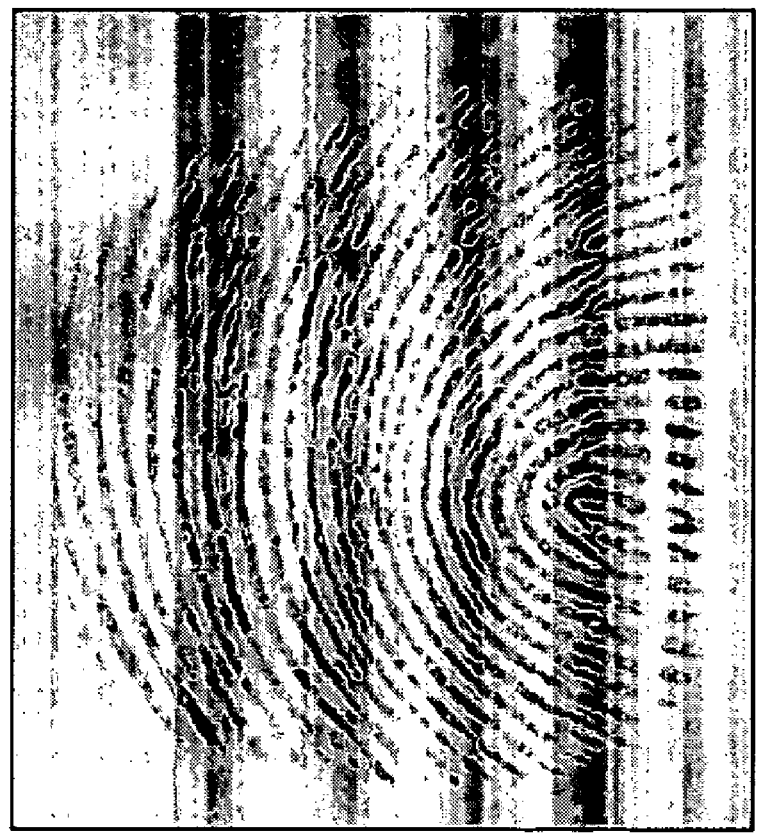
FIG. 8 is a view showing an example of a fingerprint image with a noise sampled in the fourth embodiment.

FIG. 7 is a block diagram showing a construction of the identifying device (living-body detecting means) by biometrics information as the fourth embodiment of the present invention, and FIG. 8 is a view showing an example of the fingerprint image with noise sampled in the fourth embodiment.

The identifying device in the fourth embodiment shown in FIG. 7 is provided with a living-body detecting means (living-body detecting sensor) 20D comprised by an electrode 30, a pulse signal generating means 31, an image noise detecting means 32 and a forged fingerprint discriminating means 26D. This living-body detecting means 20D applies an electric noise of a specific pattern to the finger 100 and discriminates a living body from a forged fingerprint based on appearance situation of a noise on the fingerprint image sampled by the fingerprint sensor 10.

Here, the sweep type fingerprint sensor 10 is a capacitance type or an electric-field detection type (weak electric-field type), and the electrode 30 applies a pulse signal (electric signal) generated by the pulse signal generating means 31 as an electric noise of a specific pattern to the finger 100, for which the fingerprint image is being sampled. The exposed surface of the electrode 30 is also arranged as the living-body detection surface 21b in contact with the finger 100 being moved on the side (right side in the figure) opposite to the finger moving direction of the sampling surface 11 and flush with or substantially flush with the sampling surface 11 as in the arrangement state shown in FIG. 1(C).

The image noise detecting means 32 detects the image noise (noise appearance situation on the fingerprint image sampled by the fingerprint sensor 10) according to the above electric noise (pulse signal) from a plurality of partial fingerprint images continuously sampled by the fingerprint sensor 10, and the forged fingerprint discriminating means 26D discriminates a living body from a forged fingerprint based on the image noise (noise appearance situation) detected by the image noise detecting means 32.

More specifically, even if the electric noise of the above specific pattern is applied to a forged finger made by gummy substance or the like, an image noise according to the electric noise of the specific pattern does not appear on the forged fingerprint image sampled by the fingerprint sensor 10. However, if the electric noise of the above specific pattern is applied to a living body, the image noise according to the electric noise of the above specific pattern appears on the fingerprint image sampled by the fingerprint sensor 10 as shown in FIG. 8, for example.

Thus, the living-body detecting means 20D shown in FIG. 7 can discriminate a living body from a forged fingerprint by determining by the forged fingerprint discriminating means 26D if the image noise (noise appearance situation) detected by the image noise detecting means 32 corresponds to an electric noise of the specific pattern applied to the finger 100 by the electrode 30 and the pulse signal generating means 31. That is, if the image noise (noise appearance situation) detected by the image noise detecting means 32 corresponds to the electric noise of the above specific pattern, the finger 100, for which the fingerprint image is being sampled, is determined as a living body, while if not, the finger 100, for which the fingerprint image is being sampled, is determined as a forged finger.

Note that, in the construction of the above fourth embodiment, the exposed surface of the electrode 30 is arranged as the living-body detection surface 21b on the side (right side in the figure) opposite to the finger moving direction of the sampling surface 11, but this exposed surface of the electrode 30 may be arranged as the living-body detection surface 21a on the side (left side in the figure) of the finger moving direction of the sampling surface 11 as in the arrangement state shown in FIG. 1(B).

Also, in the above-mentioned fourth embodiment, an example is shown that the living-body detecting means 20D is applied to the fingerprint sensor 10 of the sweep type, but it may be a usual planar fingerprint sensor of the capacitance type or the electric-field detection type (weak electric-field type) to which the living-body detecting means 20D is applied as above so that the finger 100, for which the fingerprint image is being sampled from the image noise, is a living body or a forged finger can be discriminated.

2-5 Fifth Embodiment

Figure 9:
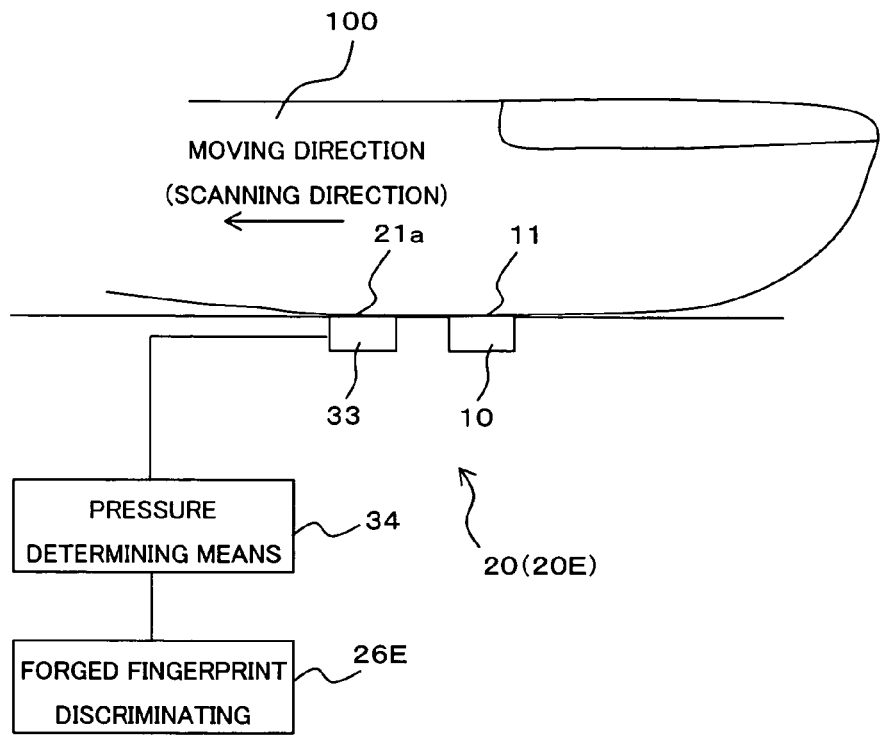
FIG. 9 is a schematic longitudinal sectional view showing a construction of an identifying device (living-body detecting means) by biometrics information as the fifth embodiment of the present invention.
Figure 10:
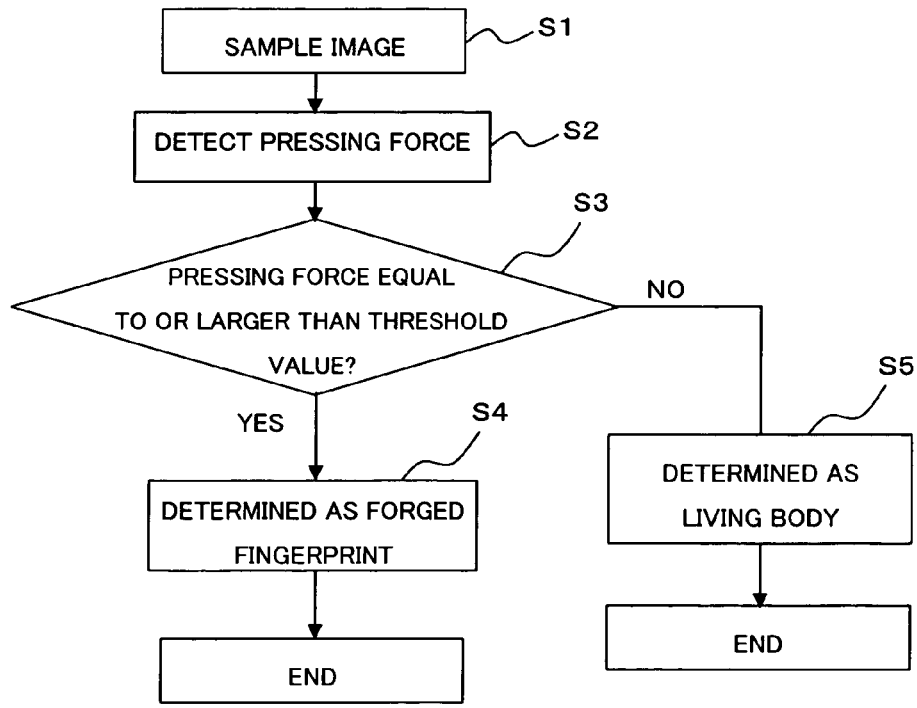
FIG. 10 is a flowchart for explaining a living-body determination procedure in the fifth embodiment.

FIG. 9 is a schematic longitudinal sectional view showing a construction of the identifying device (living-body detecting means) by biometrics information as the fifth embodiment of the present invention, and FIG. 10 is a flowchart (Steps S1 to S5) for explaining a living-body determination procedure in the fifth embodiment.

The identifying device of the fifth embodiment shown in FIG. 9 is provided with a living-body detecting means (living-body detecting sensor) 20E comprised by a pressure sensor 33, a pressure determining means 34 and a forged fingerprint discriminating means 26E. This living-body detecting means 20E detects a pressing force of the finger 100, for which the fingerprint image is being sampled, and discriminates a living body from a forged fingerprint based on the detected pressing force.

The pressure sensor 33 detects the pressing force of the finger 100, for which the fingerprint image is being sampled, on the sampling surface 11, and the exposed surface (contact surface with the finger 100) of this pressure sensor 33 is also arranged as the living-body detection surface 21b in contact with the finger 100 being moved on the side (left side in the figure) of the finger moving direction of the sampling surface 11 and flush with or substantially flush with the sampling surface 11 as in the arrangement state shown in FIG. 1(B).

Additionally, the pressure determining means 34 determines if the pressing force detected by the pressure sensor 33 is equal to or larger than a predetermined pressure (threshold value) or not, and the forged fingerprint discriminating means 26E discriminates a living body from a forged fingerprint based on the determination result by the pressure determining means 34.

More specifically, when a forged fingerprint is to be read by the fingerprint sensor 10 using a forged finger made of gummy substance, gelatin or the like, for example, it is necessary to press the forged finger on the sampling surface 11 of the fingerprint sensor 10 with a pressing force larger than the case where the fingerprint of a living finger is to be read by the fingerprint sensor 10.

Thus, the living-body detecting means 20E shown in FIG. 9, during sampling of a fingerprint image of the finger 100 by the fingerprint sensor 10 (Step S1 in FIG. 10), detects a pressing force of the finger 100 on the fingerprint sensor 10 by the pressure sensor 33 (Step S2 in FIG. 10), and determines if the detected pressing force is equal to or larger than a threshold value by the pressure determining means 34 (Step S3 in FIG. 10). Then, if the detected pressing force is equal to or larger than the threshold value (YES route of Step S3), the forged fingerprint discriminating means 26E determines that the finger 100 is a forged finger (Step S4 in FIG. 10), while if the force is less than the threshold value (NO route of Step S3), the forged fingerprint discriminating means 26E determines that the finger 100 is a living body (Step S5 in FIG. 10). In this way, discrimination between a living body and a forged fingerprint is also made possible by the living-body detecting means 20E shown in FIG. 9.

It is to be noted that, in the construction of the above fifth embodiment, the exposed surface of the pressure sensor 33 is arranged as the living-body detection surface 21b on the side (right side in the figure) opposite to the finger moving direction of the sampling surface 11, but this exposed surface of the pressure sensor 33 may be arranged as the living-body detection surface 21a on the side (right side in the figure) opposite to the finger moving direction of the sampling surface 11 as in the arrangement state shown in FIG. 1(C).

Also, the pressure sensor 33 may be arranged at a lower part (lower direction in FIG. 9) of the fingerprint sensor 10 in contact with this fingerprint sensor 10 so as to detect the pressing force of the finger 100 through the sampling surface 11 and the fingerprint sensor 10. In this case, since the pressing force of the finger 100 is detected through the fingerprint sensor 10 on which the pressing force directly acts, pressing force detection accuracy is improved. Moreover, the sampling surface 11 itself of the fingerprint sensor 10 functions as the living-body detection surface 21a/21b.

Furthermore, by detecting the pressing force of the finger 100 by the pressure sensor 33 in a time series, discrimination between a living body and a forged fingerprint (forged finger) may be made by using the time-series change of the pressing force. In that case, time series change of the pressing force of the finger of a person to be identified is detected/registered as a habit of the person to be identified at sampling of the registered fingerprint image of the person to be identified, and the time series change of the pressing force of the finger is detected by the pressure sensor 33 at sampling of a fingerprint image for verification from the person to be identified at personal identification. Then, the detected time series change and the time series change registered in advance are compared by the pressure determining means 34, and if the difference exceeds a predetermined range, the finger 100 is determined as a forged finger by the forged fingerprint discriminating means 26E, while if the difference is within the above predetermined range, the finger is determined as a living body (hence, the identity of the person to be identified is confirmed) by the forged fingerprint discriminating means 26E. That is, the time-series change of the pressing force can be used as an auxiliary determining means for identity verification (personal identification), which can further improve reliability of personal identification.

2-6 Sixth Embodiment

Figure 11:
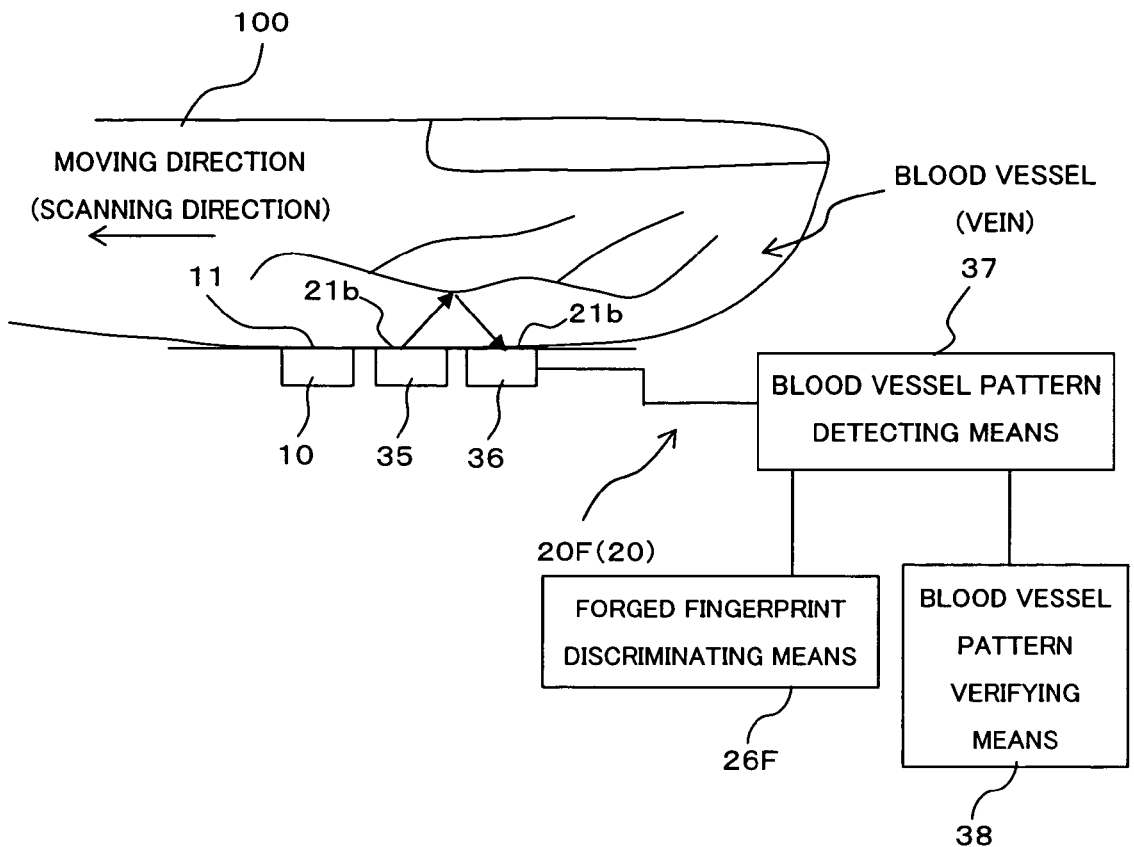
FIG. 11 is a block diagram showing a construction of an identifying device (living-body detecting means) by biometrics information as the sixth embodiment of the present invention.
Figure 12A:
FIGS. 12(A) and 12(B) are views showing examples of a fingerprint image and a blood vessel pattern sampled in the sixth embodiment, respectively.
Figure 12B:
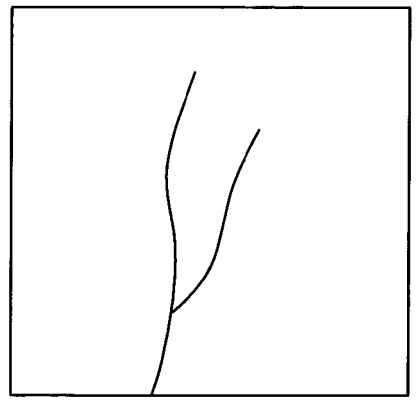

FIG. 11 is a block diagram showing a construction of the identifying device (living-body detecting means) by biometrics information as the sixth embodiment of the present invention, and FIGS. 12(A) and 12(B) are views showing examples of a fingerprint image and a blood vessel pattern sampled in the sixth embodiment, respectively.

The identifying device of the sixth embodiment shown in FIG. 11 is provided with a living-body detecting means (living-body detecting sensor) 20F comprised by a near-infrared light emitting section 35, a line sensor 36, a blood-vessel pattern detecting means 37 and a forged fingerprint discriminating means 26F, and a blood-vessel pattern verifying means 38 is also provided.

Here, the living-body detecting means (living-body detecting sensor) 20F samples a blood vessel pattern in the finger 100 by irradiating light (near-infrared light) to the finger 100, for which the fingerprint image is being sampled, and discriminates a living body from a forged fingerprint based on the sampled blood vessel pattern.

The near-infrared light emitting section 35 irradiates near-infrared light to the finger 100, for which the fingerprint image is being sampled, and the light emitting surface is arranged as the living-body detection surface 21b in contact with the finger 100 being moved on the side (right side in the figure) opposite to the finger moving direction of the sampling surface 11 and flush with or substantially flush with the sampling surface 11 as in the arrangement state shown in FIG. 1(C).

The line sensor 36 receives light obtained when the near-infrared light irradiated from the near-infrared light emitting section 35 to the finger 100 is transmitted through the finger 100, and the light receiving surface is arranged as the living-body detection surface 21b in contact with the finger 100 being moved on the side (right side in the figure) opposite to the finger moving direction of the sampling surface 11 and flush with or substantially flush with the sampling surface 11 as in the arrangement state shown in FIG. 1(C).

Note that the light emitting surface of the near-infrared light emitting section 35 is arranged between the sampling surface 11 of the fingerprint sensor 10 and the light receiving surface of the line sensor 36.

Thus, the blood-vessel pattern detecting means 37 detects a blood vessel (vein) pattern in the finger 100 by reconfiguring the blood vessel (vein) pattern in the finger 100 from one-dimensional information (partial image information of the blood vessel pattern) received/detected by the line sensor 36 using the fingerprint image sampled by the fingerprint sensor 10 and reconfigured (See FIG. 12(A), for example) as encoder information. Also, the forged fingerprint discriminating means 26F discriminates a living body from a forged fingerprint based on the detection result by the blood-vessel pattern detecting means 37.

More specifically, a forged finger made of gummy substance, gelatin or the like, for example, does not have a blood vessel (vein) therein as a matter of fact, and an image obtained by reconfiguring the one-dimensional information received/detected by the line sensor 36 as mentioned above does not have a blood vessel pattern. On the contrary, since a living finger naturally has a blood vessel (vein) therein, the image obtained by reconfiguring the one-dimensional information received/detected by the line sensor 36 as mentioned above (See FIG. 12B, for example) has a blood vessel pattern.

Thus, in the living-body detecting means 20F shown in FIG. 11, the forged fingerprint discriminating means 26F can discriminate between a living body and a forged fingerprint based on presence/absence of a blood vessel pattern in an image reconfigured by the blood-vessel pattern detecting means 37. That is, if the blood vessel pattern exists in the image reconfigured by the blood-vessel pattern detecting means 37, the finger 100, for which the fingerprint image is being sampled, is determined as a living body, while if not, the finger 100, for which the fingerprint image is being sampled, is determined as a forged finger.

At this time, the blood-vessel pattern verifying means 38 performs personal identification based on the blood vessel pattern detected by the blood-vessel pattern detecting means 37 in addition to the personal identification based on the fingerprint image sampled by the fingerprint sensor 10. That is, the blood vessel pattern of a finger of the person to be identified is sampled/registered at sampling of the registered fingerprint image of the person to be identified, and the blood vessel pattern of the finger 100 is sampled as above by the near-infrared light emitting section 35, the line sensor 36 and the blood-vessel pattern detecting means 37 at the same time when the fingerprint image for verification is sampled from the person to be identified at personal identification. Then the sampled blood vessel pattern and the blood vessel pattern registered in advance are verified similar to the case of fingerprint verification. By this, not only personal identification by fingerprint but also personal identification by blood vessel pattern is performed, which can further improve reliability of personal identification.

It is to be noted that, in the construction of the above-mentioned sixth embodiment, the pair of the light emitting surface of the near-infrared light emitting section 35 and the light receiving surface of the line sensor 36 are arranged as the living-body detection surface 21b on the side (right side in the figure) opposite to the finger moving direction of the sampling surface 11, but the light emitting surface and light receiving surface may be arranged as the living-body detection surfaces 21a, 21b, respectively, so that the sampling surface 11 of the fingerprint sensor 10 are arranged between them as in the arrangement state shown in FIG. 1(A), or they may be arranged as the living-body detection surface 21a on the side (left side in the figure) of the finger moving direction of the sampling surface 11 as in the arrangement state shown in FIG. 1(B).

Also, in the above-mentioned sixth embodiment, the one-dimensional information received/detected by the line sensor 36 is reconfigured using the fingerprint image sampled and reconfigured by the fingerprint sensor 10 as encoder information, but on the contrary, after the blood vessel pattern image as shown in FIG. 12(B), for example, is reconfigured from the one-dimensional information received/detected by the line sensor 36, the fingerprint image as shown in FIG. 12(A), for example, may be reconfigured from the partial fingerprint image sampled by the fingerprint sensor 10 using the blood vessel pattern image as encoder information.

2-7 Seventh Embodiment

Figure 13:
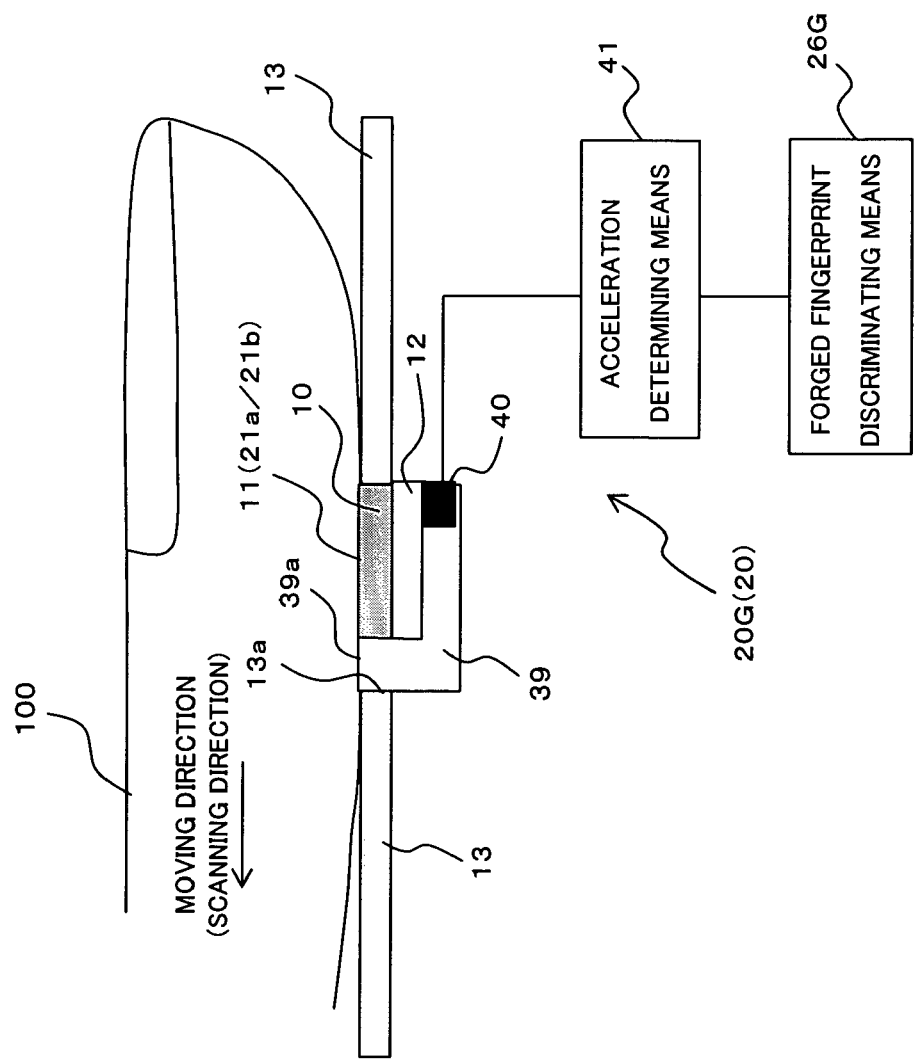
FIG. 13 is a schematic longitudinal sectional view showing a construction of an identifying device (living-body detecting means) by biometrics information as the seventh embodiment of the present invention.

FIG. 13 is a schematic longitudinal sectional view showing the construction of the identifying device (living-body detecting means) by biometrics information as the seventh embodiment of the present invention. The identifying device of the seventh embodiment shown in FIG. 13 is provided with a living-body detecting means (living-body detecting sensor) 20G comprised by a rubber platform 39, an acceleration sensor 40, an acceleration determining means 41 and a forged fingerprint discriminating means 26G. This living-body detecting means 20G detects an acceleration of the finger 100, for which the fingerprint image is being sampled, and discriminates a living body from a forged fingerprint based on the detected change of acceleration.

In the seventh embodiment, as shown in FIG. 13, the acceleration sensor 40 is mounted on a board 12 of the fingerprint sensor 10, and this fingerprint sensor 10 with the acceleration sensor 40 (board 12) is mounted to the rubber platform 39 in the L-shape. Additionally, an upper end 39a of the L-shaped rubber platform 39 and the sampling surface 11 of the fingerprint sensor 10 are exposed to the outside through an opening portion 13a of an enclosure 13 of this device. At this time, the sampling surface 11 of the fingerprint sensor 10 is flush with an upper face of the enclosure 13 or projects slightly upward from the upper face of the enclosure 13. At this time, in the seventh embodiment, the sampling surface 11 of the fingerprint sensor 10 itself functions as the living-body detection surface 21a/21b.

When the finger 100 is placed and sweeping of the finger 100 is started, the board 12 of the fingerprint sensor 10 is displaced in the horizontal direction (moving direction of the finger 100) by a slight amount while elastically deforming the rubber platform 39 by friction between the finger 100 and the sampling surface 11 of the fingerprint sensor 10. The acceleration sensor 40 detects the acceleration in a time series when the above displacement is generated.

Also, in the seventh embodiment, a habit at sweeping of the finger of the person to be identified is detected/registered as time-series change of acceleration at sampling of a registered fingerprint image of the person to be identified. And the acceleration determining means 41 compares time-series change of the acceleration of the finger 100 detected by the acceleration sensor 40 and the time-series change of the acceleration registered in advance for the person to be identified, and the forged fingerprint discriminating means 26G discriminates a living body from a forged fingerprint based on the comparison result by the acceleration determining means 41.

More specifically, at sampling of a fingerprint image for verification from a person to be identified at personal identification, time-series change of acceleration of the finger 100 is detected by the acceleration sensor 40 at the same time. Then the detected time-series change and the time-series change registered in advance are compared by the acceleration determining means 41, and if the difference exceeds a predetermined range, the finger 100 is determined as a forged finger by the forged finger discriminating means 26G, while if the difference is within the above predetermined range, the finger 100 is determined as a living body (hence, that the identity of the person to be identified is confirmed) by the forged finger discriminating means 26G.

In this way, discrimination between a living body and a forged fingerprint is made possible also by the living-body detecting means 20G shown in FIG. 13, and moreover, time-series change of acceleration can be also used as an auxiliary determining means for identity verification (personal identification), which can further improve reliability of personal identification.

It is to be noted that a forged fingerprint made by gummy substance, gelatin or the like, for example, has a different surface friction and the acceleration is largely different.

2-8 Eighth Embodiment

Figure 14:
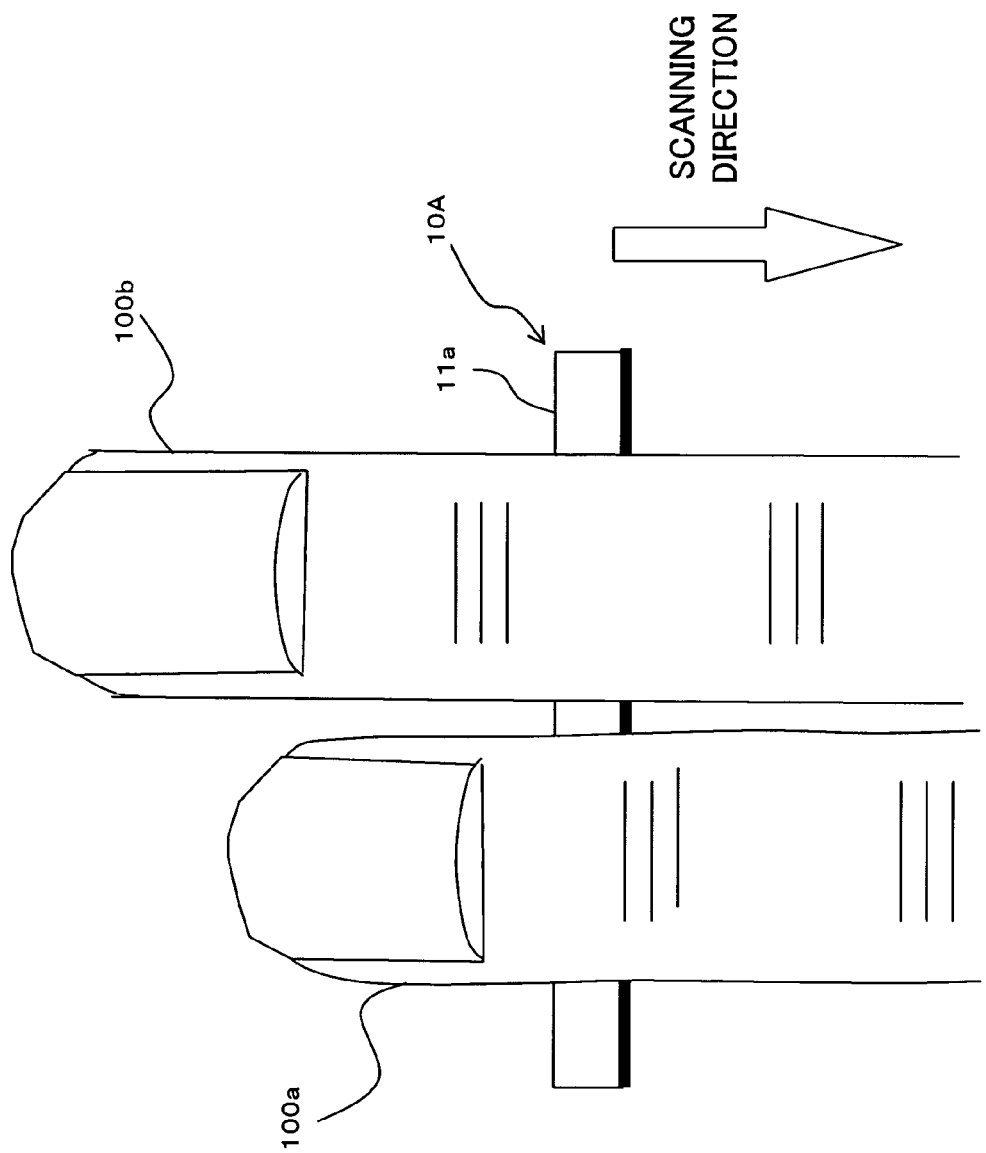
FIG. 14 is a schematic plan view showing a fingerprint sensor in an identifying device by biometrics information as the eighth embodiment of the present invention.
Figure 15:
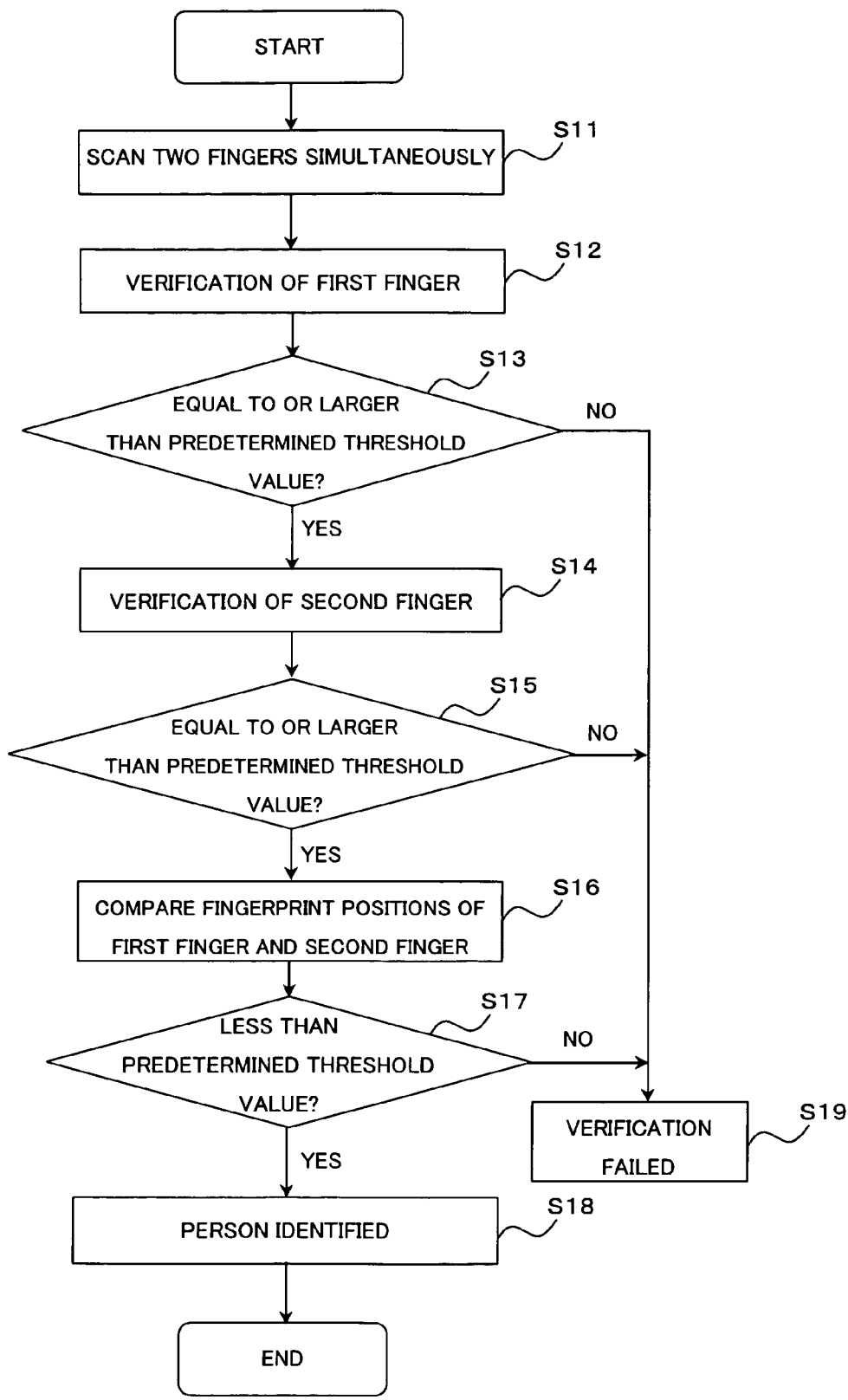
FIG. 15 is a flowchart for explaining an operation of the identifying device by biometrics information as the eighth embodiment of the present invention.

FIG. 14 is a schematic plan view showing a fingerprint sensor in the identifying device by biometrics information as the eighth embodiment of the present invention, and FIG. 15 is a flowchart for explaining operation of the identifying device by biometrics information as the eighth embodiment of the present invention.

A sweep type fingerprint sensor (biometrics information input section) 10A in the identifying device shown in FIG. 14 basically has the same structure as that of the sweep type fingerprint sensor 10 in the above first to the seventh embodiments and samples a fingerprint image from a finger of a person to be identified similarly to the fingerprint sensor 10, but the sweep type fingerprint sensor 10A of the eighth embodiment is different from the sweep type fingerprint sensor 10 in the first to the seventh embodiments in the widths of the sampling surfaces 11a, 11 (longitudinal length).

That is, the sampling surface 11 of the sweep type fingerprint sensor 10 of the first to the seventh embodiments has a width (approximately 16.1 mm as mentioned above) capable of sampling the fingerprint image from the single finger 100 of the person to be identified, while the sampling surface 11a of the sweep type fingerprint sensor 10A of the eighth embodiment has a width (35 mm or more, for example) capable of sampling/inputting a fingerprint image of a plurality of fingers (2 fingers, a right-hand forefinger 100a and a right-hand middle finger 100b in the eighth embodiment) as a living body portion as biometrics information for verification at the same time. By this, it becomes possible to sweep the forefinger 100a and the middle finger 100b at the same time and to sample two fingerprint images at the same time as shown in FIG. 14, for example.

Also, in the eighth embodiment, a position relation between the plurality of fingers (the forefinger and the middle finger, for example) of the person to be identified is detected/registered at sampling of a registered fingerprint image of the person to be identified.

Operation of the identifying device of eighth embodiment that the fingerprint images of the plurality of fingers (100a, 100b) are sampled at the same time in this way will be described according to the flowchart (Steps S11 to S19) shown in FIG. 15. First, the two fingers 100a, 100b are swept at the same time by the fingerprint sensor 10A (Step S11), a first finger (the forefinger 100a, for example) is verified (Step S12), and a verification matching rate is determined for the first finger (Step S13). If the verification matching rate is less than a predetermined threshold value (NO route of Step S13), it is determined as verification failure (Step S19), while if it is equal to or larger than the predetermined threshold value (YES route of Step S13), a second finger (the middle finger 100b, for example) is verified (Step S14). In this case also, as with the above, the verification matching rate for the second finger is determined (Step S15), and if the verification matching rate is less than a predetermined threshold value (NO route of Step S15), it is determined as verification failure (Step S19), while if the rate is equal to or larger than the predetermined threshold value (YES route of Step S15), the position relation between the first finger and the second finger sampled at personal identification is compared with that registered in advance for the person to be identified (Step S16). Then a difference between the two position relations is determined (Step S17) and if the difference is equal to or larger than a predetermined threshold value (NO route of Step S17), it is determined as verification failure (Step S19), while if the difference is less than the predetermined threshold value (YES of Step S17), it is determined/confirmed that the person to be identified is the registered person himself/herself (Step S18).

With the identifying device that can sample the fingerprint images of the plural fingers (100a, 100b) at the same time as mentioned above, the following operational advantages can be obtained.

First, input of forged fingerprints can be suppressed by registering the relation of input positions of at least two fingerprint images. By sampling the fingerprints of the forefinger 100a and the middle finger 100b at the same time, for example, the position relation of fingerprint information of the forefinger 100a and the middle finger 100b can be also used as information to identify the person. That is, there is an effect that difficulty of forgery is increased than a single fingerprint.

Secondly, by sampling and verifying the two fingerprint images at the same time, more accurate fingerprint identification is enabled with one action.

It is to be noted that, also in the identifying device (fingerprint sensor 10A) of the eighth embodiment, the living-body detection surfaces 21a, 21 of the living-body detecting means 20 (20A to 20G) are also arranged as in the first to the seventh embodiments, and the same operational advantages as in the above-mentioned first to the seventh embodiments can be obtained, but even without the living-body detecting means 20 (20A to 20G), the above operational advantages specific to the identifying device of the eighth embodiment can be obtained.

2-9 Ninth Embodiment

Figure 16:
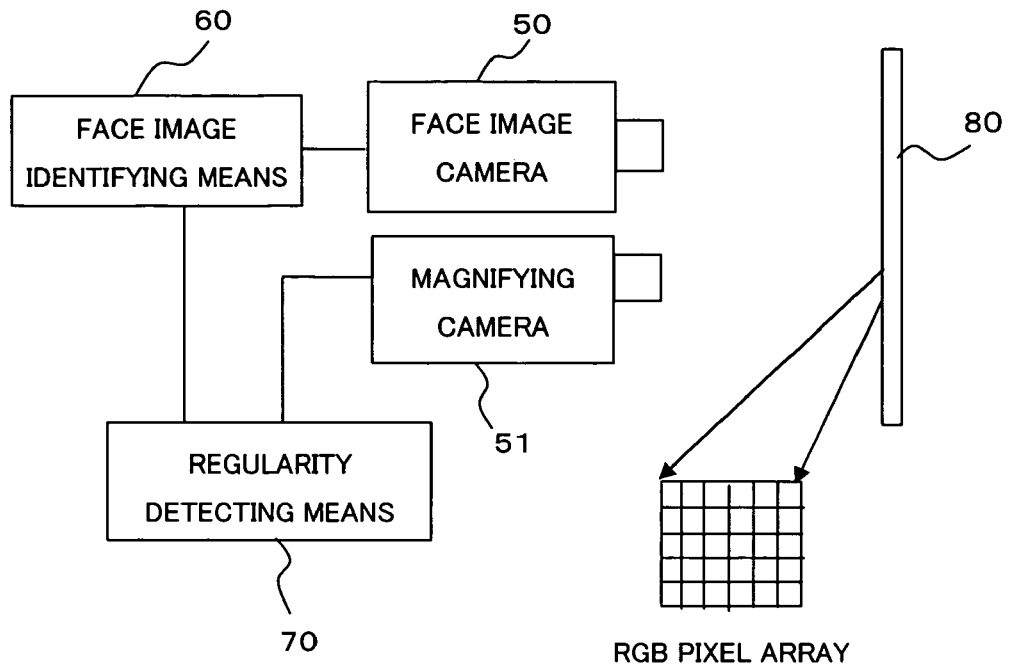
FIG. 16 is a block diagram showing a construction of an identifying device by biometrics information as the ninth embodiment of the present invention.
Figure 17:
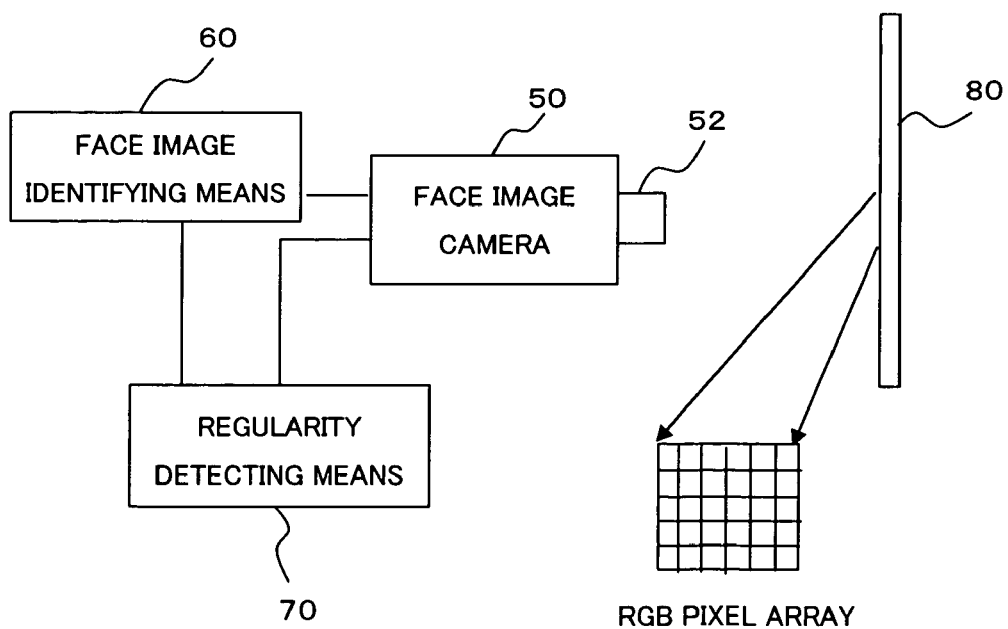
FIG. 17 is a block diagram showing a construction of a modification of the identifying device by biometrics information as the ninth embodiment of the present invention.

FIG. 16 is a block diagram showing a construction of the identifying device by biometrics information as the ninth embodiment of the invention, and FIG. 17 is a block diagram showing a modification of the identifying device by biometrics information as the ninth embodiment of the invention.

As shown in FIGS. 16 and 17, the identifying device in the ninth embodiment has a construction different from the basic construction of the first to the eighth embodiments described referring to FIGS. 1(A) to 1(C). The identifying device shown in FIG. 16 comprises a face image camera 50, a magnifying camera 51, a face image identifying means 60 and a regularity detecting means 70.

The face image camera (living-body information input section) 50 picks up/inputs the face of a person to be identified (living body portion) so as to sample face image information for verification (biometrics information for verification) from the face of the person to be identified to be compared/verified with the registered face image information (registered biometrics information) at personal identification.

The face image identifying means 60 performs personal identification by comparing/verifying the face image information sampled by the face image camera 50 with the registered face image information registered in advance for the person to be identified.

Additionally, in the ninth embodiment, the magnifying camera 51, the face image identifying means 60 and the regularity detecting means 70 function as the living-body detecting means for detecting if the face, for which face image information for verification is being sampled/inputted by the face camera 50, is a living body or not. The living-body detecting means in this ninth embodiment obtains a close-up image of the face of the person to be identified, and when a regular color pixel array is detected from the obtained close-up image, the living-body detecting means determines that the face image information sampled by the face image camera 50 is inputted by a forged article, not a living body.

More specifically, the magnifying camera 51 captures/obtains a close-up image (enlarged image) of the face of the person to be identified being captured by the face image camera 50 and it is attached to the face image camera 50.

Moreover, the regularity detecting means 70 detects presence/absence of a regular color pixel array from the close-up image (enlarged image) obtained by the magnifying camera 51.

Here, component colors of the regular color pixel array include, for example, a combination of red (R), green (G) and blue (B), a combination of yellow (Y), magenta (M), cyan (C) and black (K), or a combination of yellow (Y), magenta (M), cyan (C). The combination of red (R), green (G) and blue (B) is detected when a forged face image displayed on a high-definition liquid crystal panel 80 is presented to the cameras 50, 51 as shown in FIG. 16, for example. Also, the combination of yellow (Y), magenta (M), cyan (C) and black (K) or the combination of yellow (Y), magenta (M) and cyan (C) is detected when a face image printed matter on which a high-definition image is printed out is presented to the cameras 50, 51.

Additionally, the face image identifying means 60 determines that the face being captured is not a living body, that is, a forged article (liquid crystal screen or high-definition printed matter) when presence of the above-mentioned regular color pixel array is detected by the regularity detecting means 70, while if the presence of the regular color pixel array is not detected, the face being captured is determined as a living body.

In the identifying device of the ninth embodiment, when the face image by the high-definition liquid crystal panel 80 is inputted through the cameras 50, 51, regular RGB pixel arrays are detected from enlarged images by the camera 51 and the regularity detecting means 70, and when a face image of a printed matter on which a high-definition image is printed out, for example, is inputted through the cameras 50, 51, regular pixel arrays of YMCK or YMC are detected from enlarged images by the camera 51 and the regularity detecting means 70.

Therefore, a living body and a forged article can be surely discriminated by surely detecting whether or not a face being captured by the cameras 50, 51 is a forged article such as a display (liquid crystal panel 80) or a printed matter, and input/personal identification by a forged article (face, which is not a living body) can be surely precluded. By this, the identifying device of the ninth embodiment can also surely preclude illegal use by impersonation using a forged article and realize more reliable personal identification.

It is to be noted that, in the identifying device shown in FIG. 17, in place of the magnifying camera 51 in the identifying device shown in FIG. 16, a magnifying lens 52 (zoom function) is provided at the face image camera 50, and the identifying device shown in FIG. 17 obtains the same close-up image (enlarged image) as above by the magnifying lens 52 (zoom function) of the face image camera 50. Only this point is a difference between the identifying device shown in FIG. 16 and the device shown in FIG. 17, and the identifying device shown in FIG. 17 can also obtain the same operational advantage as that of the identifying device shown in FIG. 16.

Also, in the above-mentioned ninth embodiment, the case where a face is captured/sampled as biometrics information has been described. However, the present invention is not limited to this but may be applied to the case where an image of an iris, blood vessel pattern, auricle, fingerprint, palm print or hand print is sampled/inputted in the noncontact manner using a camera or the like and used as biometrics information, and the same operational advantage as that of the above ninth embodiment can be obtained.

3 Others

It is to be noted that the present invention is not limited to the above-mentioned embodiments, but various variations are possible without deviating from the gist of the present invention.

INDUSTRIAL APPLICABILITY

As mentioned above, according to the present invention, since the living-body detection surface of the living-body detecting means is arranged in contact with or in the proximity to a living body portion being moved with respect to the biometrics information input section, whether the living body portion, for which biometrics information is being sampled, is a living body or not can be surely detected, illegal use by impersonation using a forged fingerprint or the like is surely precluded and more reliable personal identification can be realized.

Therefore, the present invention is suitable to be used for an identification system which performs a personal identification using biometrics information such as an iris, face, blood vessel pattern, auricle, fingerprint, palm print, hand print or the like, for example, and its usability is considered to be extremely high.

What is claimed is:

1. An identifying device by biometrics information comprising:

a biometrics information input section to sample biometrics information for verification, which is used for comparison/verification with registered biometrics information at personal identification, from a living body portion of a person to be identified and to input the sampled biometrics information for verification; and a living-body detector to detect if the living body portion, for which the biometrics information for verification is being sampled/inputted by the biometrics information input section, is a living body or not, wherein the biometrics information input section is to sample/input the biometrics information for verification as image information from the living body portion moving relatively with respect to the biometrics information input section, a living-body detection surface in the living-body detector is arranged in contact with or in the proximity to the living body portion being moved with respect to the biometrics information input section so as to input the biometrics information for verification, the living body portion is a finger of the person to be identified, the biometrics information input section is to sample/input a fingerprint image of the finger as the biometrics information for verification, and the living-body detector is to detect a forged fingerprint, and the living-body detector samples a blood vessel pattern in the finger by irradiating light to the finger and discriminates a living body from a forged fingerprint based on an absence or presence of the sampled blood vessel pattern.

2. The identifying device by biometrics information according to claim 1, wherein the living-body detector samples a blood vessel pattern in the finger by a line sensor, and an image of the blood vessel pattern in the finger is reconfigured from a partial image sampled by the line sensor based on a fingerprint image sampled by the biometrics information input section.

3. The identifying device by biometrics information according to claim 1, wherein the living-body detector samples a blood vessel pattern in the finger by a line sensor, and the fingerprint image is reconfigured from a partial image sampled by the biometrics information input section based on a image of the blood vessel pattern in the finger sampled by the line sensor.

4. The identifying device by biometrics information according to claim 1, wherein the biometrics information input section has a width capable of simultaneously sampling/inputting fingerprint images as the biometrics information for verification of a plurality of fingers as the living body portion.

* * * * *